Aug. 12, 1930.  R. W. DULL  1,772,711
ROLLER BEARING AND LUBRICATION MEANS THEREFOR
Filed Sept. 19, 1927
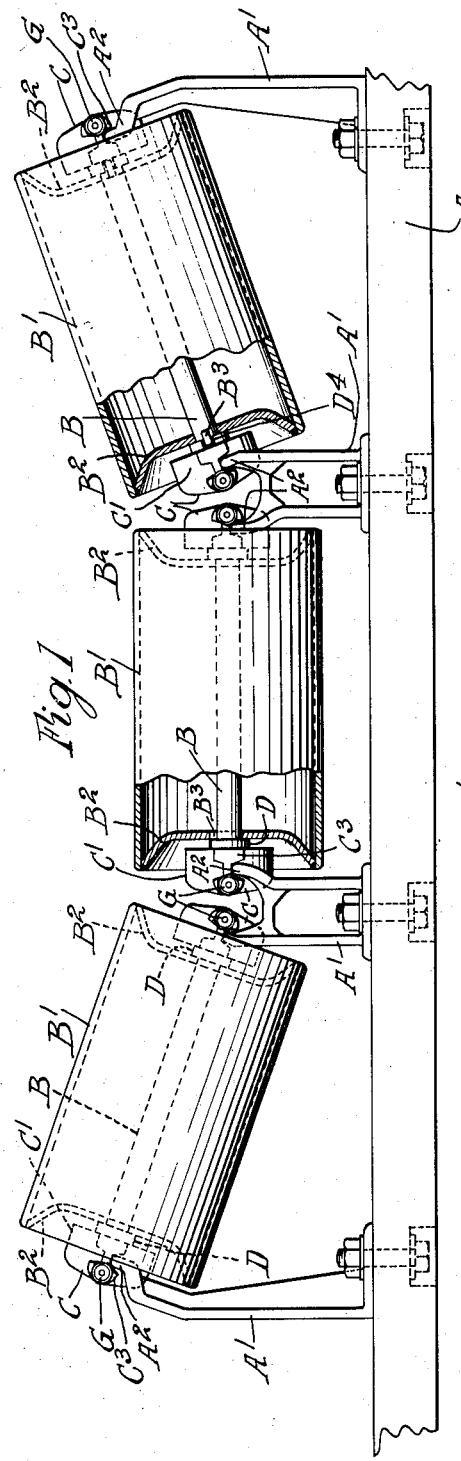
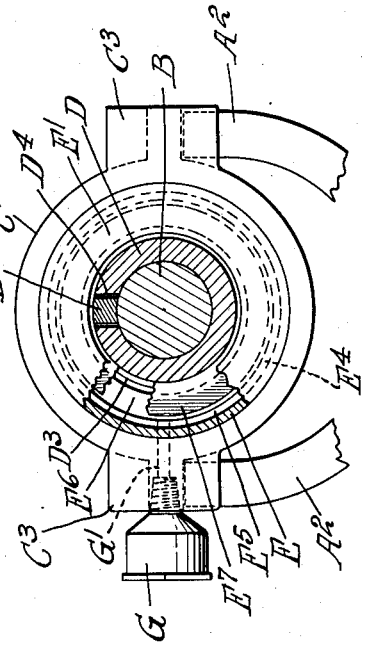
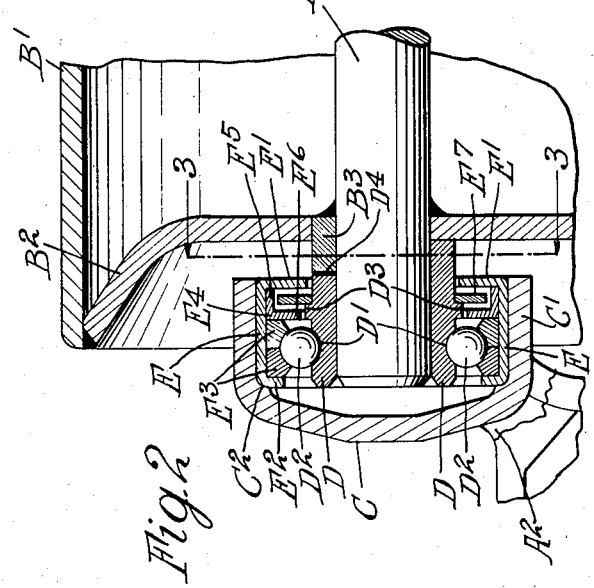
Inventor
Raymond W. Dull
by Parker & Carter
Attorneys.

Patented Aug. 12, 1930

1,772,711

UNITED STATES PATENT OFFICE

RAYMOND W. DULL, OF CHICAGO, ILLINOIS, ASSIGNOR TO LINK-BELT COMPANY, OF CHICAGO, ILLINOIS, A CORPORATION OF ILLINOIS

ROLLER BEARING AND LUBRICATION MEANS THEREFOR

Application filed September 19, 1927. Serial No. 220,530.

My invention relates to bearing assemblies and particularly to a bearing assembly having a self-contained lubricating means associated therewith. One object of my invention is to provide a bearing unit which is quickly and easily assembled and taken down. Another object is the provision of a bearing unit having an improved grease labyrinth or seal, the bearing and seal being preferably assembled as a complete unit. My invention is adaptable to roller or ball bearings but is not limited to such use.

I illustrate my invention more or less diagrammatically in the drawings, wherein—

Figure 1 is an elevation with parts in section;

Figure 2 is an enlarged axial section; and

Figure 3 is a section on the line 3—3 of Figure 2.

Like parts are indicated by like symbols throughout the specification and claims.

I have illustrated my invention in connection with an anti-friction belt conveyor idler, although obviously the particular bearing and oiling means employed may be applied to a number of uses.

Referring to Figure 1 A is any suitable base or support from which project upwardly any suitable standards $A^1$ which terminate in the forks $A^2$.

B is any suitable pulley shaft upon which are mounted the cylindrical pulleys $B^1$ with the heads or ends $B^2$. $B^3$ is a lug or stud mounted upon the shaft B, or head $B^2$.

Referring to the bearing and lubricating assembly proper, as shown in detail in Figures 2 and 3, C is an outer shell member associated with the cylindrical wall $C^1$ recessed as at $C^2$ to receive the bearing assembly. $C^3$ are lugs outwardly projecting from the shell C, which may seat in the ends of the forks $A^2$ to provide a flexible or tilting connection between the pulleys and the supporting forks, whereby the necessity of providing means for aligning the bearings is avoided.

D is the inner ball race which is channeled as at $D^1$ to receive the balls $D^2$ and is provided with a circumferential projecting flange $D^3$, the purpose of which will later appear. It is slotted as at $D^4$ to conform to the lug $B^3$ on the shaft B, whereby the entire assembly may be slipped axially upon the shaft.

E is an inner shell member conforming to the interior of the cylindrical walls $C^1$ and abutting against the ledge or abutment $C^2$. It is provided with an inner inturned flange $E^1$ which closely approaches the inner race member D, and with an outer circumferential flange $E^2$. Positioned within it is the outer compound ball race member $E^3$ which is held in position for example by the angle ring $E^4$ having the cylindrical portion $E^5$ conforming to the inner side of the member E, this edge abutting against the flange $E^1$. The inwardly projecting wall $E^6$ of such ring terminates just short of the circumferential flange $D^3$ on the sleeve D. $E^7$ indicates a ring mounted on the sleeve D, the inner edge of which abuts against the lug $D^3$. It will be understood that the flanges $E^6$, $E^7$ and $E^1$, lying in parallel planes perpendicular to the axis of the shaft B, form a labyrinth for the grease passing inwardly along the shaft from the ball bearings.

G indicates any suitable grease cup from which extends a passage $G^1$ to the interior of the outer shell member C, whereby grease may be supplied to the space within such shell and thereby to the ball bearings.

It will be realized that whereas I have described and shown a practical and operative device, nevertheless many changes might be made in the size, shape, number and disposition of parts without departing from the spirit of my invention. I therefore wish my description and drawings to be taken as in a broad sense diagrammatic rather than as limiting me to my specific showing.

It will be understood in particular that my invention is applicable for use either with roller or with ball bearings, or with any other type of bearing to which a relatively stiff lubricant is applied.

In the description and drawings I have illustrated my invention as applied to a unit wherein a shaft is employed but my invention is equally applicable to a unit wherein the stub shafts or trunnions or cylindrical lugs are mounted on or associated with the end or head $B^2$, in place of the shaft B as shown. Such modification of the structure need have no effect on the application of my invention and where in the claims I employ the term "shaft", it will be understood that by "shaft" I mean any member or members projecting from or associated with the ends of a pulley or any other rotating member.

The use and operation of my invention are as follows:

I provide a bearing and a grease seal which is a self-contained unit and which can be inserted into the bearing cage or housing without any additional parts. Considering first the shell or cage C the bearing unit is slipped into it until the corner of the outer sleeve E abuts against the ledge $C^2$. The opposite flanges $E^1$ and $E^2$ of the sleeve E serve to confine the outer ball races $E^3$ in position and also to hold the intermediate labyrinth member $E^6$ in position.

The entire unit may be slipped axially upon the shaft and no pin or transverse member or detachable locking member is employed. The unit is simply so slipped on the shaft as to engage the slot $D^4$ with the lug $B^3$. Retrograde axial movement of the assembly is prevented as long as the roller is seated in its supporting structure with the bearing cage mounted in the fork members $A^2$.

The grease is injected through the grease cup G by any suitable means for applying pressure and the space within the shell or cage C and about the end of the shaft is normally full. The grease is forced into the space occupied by the balls, or by the rollers, if rollers are used, from which it passes between the flange or retainer $E^4$ and the lug $D^3$. Its movement is first inwardly along the shaft from the ball bearings and then outwardly away from the center of the shaft between the flanges $E^6$ and $E^7$. It then rounds the outside of the flange $E^7$ and moves inwardly toward the shaft center between the flanges $E^7$ and $E^1$. It finally escapes about the inner edge of the flange $E^1$. Before the grease can liberate itself from the bearing its travel will effectively prevent dirt and grit from entering the bearing.

The assembly of the parts described forms what is known as a labyrinth seal, which is a peculiarly effective seal. The seal and the bearings form a single unit which can be slipped on and off the shaft and is prevented from turning in relation to the shaft by means of the engaged slot and lugs above described.

I claim:

1. In a bearing structure adapted to surround the end of a rotating shaft, an outer shell in the form of a cup, a holding ring seated in the open end of said cup, an outer race mounted in said holding ring, a sleeve adapted slidably to engage said shaft, said sleeve being slotted to receive the projection on said shaft, and bearing members interposed between said sleeve and said outer race, and a labyrinth interposed between said ring and said sleeve, comprising a plurality of spaced flanges lying in planes generally perpendicular to the axis of rotation of the shaft, some of said flanges projecting outwardly from said sleeve and some inwardly toward said sleeve.

2. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a labyrinth mounted about said inner race member, said labyrinth including a member adapted substantially to close the open side of said housing.

3. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a labyrinth mounted about said inner race member, said labyrinth including a longitudinal extension inwardly along said shaft of inner race member, a flange projecting outwardly from said inner race member and a flange projecting inwardly from the outer race.

4. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a labyrinth associated with said inner race member, said labyrinth including a longitudinal extension inwardly along said shaft of said inner race member, a flange projecting outwardly from said inner race member and a flange projecting inwardly from the outer race, and including a securing ring surrounding said outer race and said first mentioned inwardly projecting flange, said ring having a flange adapted substantially to close the open side of said housing.

5. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a holding ring mounted within the open side of said housing and adapted to surround the outer race, said ring being provided with an inwardly extending flange on its edge opposite to the end of the shaft and a labyrinth interposed between inner and outer race, said flange forming part of said labyrinth.

6. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a holding ring mounted within the open side of said housing and adapted to surround the outer race, said ring being provided with an inwardly extending flange on its edge opposite to the end of the shaft and a labyrinth interposed between inner and outer race, said flange forming part of said labyrinth, said inner race being inwardly extended along the shaft and being adapted to underlie and form part of said labyrinth.

7. In a bearing structure, a shaft, an inner race longitudinally slidable in relation to said shaft, means for preventing rotation of said inner race in relation to said shaft, an outer race positioned about said shaft, an outer housing member surrounding the end of said shaft and said outer race, said housing being open on the side opposite the end of the shaft, a holding ring mounted within the open side of said housing and adapted to surround the outer race, said ring being provided with an inwardly extending flange on its edge opposite to the end of the shaft and a labyrinth interposed between inner and outer race, said flange forming part of said labyrinth, said inner race being inwardly extended along the shaft and being adapted to underlie and form part of said labyrinth, and being provided with an outwardly projecting flange positioned within and overlapping the flange inwardly extending from the holding ring.

8. In a bearing structure, a shaft, an inner race longitudinally slidable in relation to said shaft, means for preventing rotation of said inner race in relation to said shaft, an outer race positioned about said shaft, a holding member surrounding said outer race, an outer housing member surrounding the end of said shaft and said outer race and holding member, said housing being open on the side opposite the end of the shaft, a labyrinth mounted about said inner race member, said labyrinth including a portion of said holding member adapted substantially to close the open side of said housing, and means for directing a lubricant into the space within said housing.

9. In a roller and bearing structure therefor, a shaft, a roller body upon said shaft, an inner race upon said shaft, longitudinally slidable in relation to said shaft, a member on said shaft adapted to engage said roller and said inner race and to prevent rotation of roller and race in relation to said shaft, an outer race positioned about said shaft, and an outer housing member surrounding the end of said shaft and said outer race, the end of said housing toward said roller being open, the roller assembly which includes the inner and outer race being freely removable axially therefrom, and a labyrinth positioned within the open end of said housing, said labyrinth being unitarily removable and structurally associated with the roller assembly.

10. In a bearing structure, a bearing cage, a bearing assembly removably mounted in said cage and freely slidable as a unit into and out of the open end thereof, said bearing assembly including an inner race, an outer race and bearings therebetween and a labyrinth adapted substantially to close the open end of the cage, and a shaft axially freely slidable in relation to said inner race and means for preventing relative rotation of shaft and inner race when the shaft is inserted into operative bearing position, the inner race member having a lateral extension about which said labyrinth is mounted.

11. In a bearing structure, a bearing cage, a bearing assembly removably mounted in said cage and freely slidable as a unit into and out of the open end thereof, said bearing assembly including an inner race, an outer race and bearings therebetween and a labyrinth adapted substantially to close the open end of the cage, the outer race, the bearings and the labyrinth all overlying and lying intermediate the ends of the inner race.

12. In a bearing structure, a bearing cage, a bearing assembly removably mounted in said cage and freely slidable as a unit into and out of the open end thereof, said bearing assembly including an inner race, an outer race and bearings therebetween and a labyrinth adapted substantially to close the open end of the cage, and a shaft axially freely slidable in relation to said inner race and means for preventing relative rotation of shaft and inner race when the shaft is inserted into operative bearing position, the inner race member having a lateral extension about which said labyrinth is mounted, and means for introducing a lubricant into said cup interiorly of the bearing assembly unit.

Signed at Chicago, county of Cook, and State of Illinois, this 15th day of September, 1927.

RAYMOND W. DULL.